United States Patent [19]

Herzog et al.

[11] Patent Number: 4,571,699
[45] Date of Patent: Feb. 18, 1986

[54] OPTICAL MARK RECOGNITION FOR CONTROLLING INPUT DEVICES, HOSTS, AND OUTPUT DEVICES

[75] Inventors: Alexander Herzog; Larry L. Honomichl; Jagdish M. Nagda, all of Boulder; Teddy A. Rehage, Longmont, all of Colo.

[73] Assignee: International Business Machines Corporation, Armonk, N.Y.

[21] Appl. No.: 384,708

[22] Filed: Jun. 3, 1982

[51] Int. Cl.[4] .............................................. G06F 3/00
[52] U.S. Cl. .................................................... 364/900
[58] Field of Search ... 364/200 MS File, 900 MS File; 382/6 L

[56] References Cited

U.S. PATENT DOCUMENTS

| 3,594,495 | 7/1971 | Bond | 178/5 |
|---|---|---|---|
| 3,828,325 | 8/1974 | Stafford et al. | 364/200 |
| 4,031,518 | 6/1977 | Holloran et al. | 364/900 |
| 4,058,672 | 11/1977 | Crager et al. | 178/3 |
| 4,065,810 | 12/1977 | Cramer et al. | 364/200 |
| 4,086,443 | 4/1978 | Gorham et al. | 179/90 |
| 4,153,931 | 5/1979 | Green et al. | 364/200 |
| 4,156,798 | 5/1979 | Doelz | 364/200 |
| 4,207,598 | 6/1980 | Reich et al. | 358/257 |
| 4,463,417 | 7/1984 | Bushaw et al. | 364/200 |

OTHER PUBLICATIONS

M. R. DeSousa, Electronic Information Interchange in an Office Environment, IBM System Journal, vol. 21, No. 1, 1981.

G. D. Schultz, An Anatomy of SNA, Computer World/Extra, pp. 35–38.

Primary Examiner—Gareth D. Shaw
Assistant Examiner—Daniel K. Dorsey
Attorney, Agent, or Firm—Carl M. Wright; Joscelyn G. Cockburn

[57] ABSTRACT

The operation of a document distribution network having one or more input work stations, a linking network with one or more nodes and one or more output work stations, is controlled by a job control sheet. The job control sheet is partitioned into a plurality of control zones. Each zone contains dedicated marked sense information for controlling the input work stations, the network nodes and the output work stations. The input work station includes a marked sense recognition device which coacts with the job control sheet to identify the presence or absence of the control zones. Marked sense information which is associated with the input station control zones is extracted and utilized to control the input work station. The marked sense information which is associated with network nodes control zone is encoded and transmitted with identifying marks to the network nodes for further processing. The marked sense information which is associated with the output station control zone is extracted, encoded and is transmitted to the network node. The network node routes the information to the output work station.

5 Claims, 18 Drawing Figures

FIG. 4(A)

| Location Code Directory | | | | |
|---|---|---|---|---|
| A: BOSTON | E: DENVER | I: MIAMI | M: PHILADELPHIA |
| B: BOULDER | F: HOUSTON | J: NEW ORLEANS | N: SEATTLE |
| C: CHICAGO | G: LAS VEGAS | K: NEW YORK | O: WASHINGTON |
| D: DALLAS | H: LOS ANGELES | L: PITTSBURGH | Z: DIST. LIST |

FIG. 8(A)

```
                     MAIN_PROGRAM                                    */ CSR00040
*/*  Interrupt from the cover sheet recognition device               */ CSR00041
*/*  SELECT on the conclusion of the CSR device concerning           */ CSR00042
*/*         the current scan line.                                   */ CSR00043
*/*    WHEN no reference mark was found on the current line          */ CSR00044
*/*       IF number of lines scanned exceeds the number              */ CSR00045
*/*          allowed for recognition to occur and recognition        */ CSR00046
*/*          has not occured.                                        */ CSR00047
*/*       THEN Indicate the sheet scanned is not a Control           */ CSR00048
*/*            Sheet.                                                */ CSR00049
*/*       ELSE-DO                                                    */ CSR00050
*/*          IF this is a transition out of a reference mark         */ CSR00051
*/*             area (a line of marks has been found)                */ CSR00052
*/*          THEN-DO                                                 */ CSR00053
*/*             IF the counts indicate a skewed page                 */ CSR00054
*/*                (determine skew)*                                 */ CSR00055
*/*             THEN terminate control sheet mark process            */ CSR00056
*/*             ELSE-DO                                              */ CSR00057
*/*                Convert the CSR device counts to marks            */ CSR00058
*/*                (Convert Counter)*                                */ CSR00059
*/*                Check for a control band found.                   */ CSR00060
*/*                (Check Whether Control Band).*                    */ CSR00061
*/*                IF this band is a control band                    */ CSR00062
*/*                   THEN (Check Control Sheet).*                   */ CSR00063
*/*             END-ELSE convert device counts into marks            */ CSR00064
*/*          END-THEN                                                */ CSR00065
*/*       END-ELSE                                                   */ CSR00066
*/*    END-WHEN no reference mark on the current scan line           */ CSR00067
*/*    WHEN a reference mark exists on the current scan line         */ CSR00068
*/*       IF skew of the scanned line is acceptable                  */ CSR00069
*/*       THEN add the counter values into the totals for            */ CSR00070
*/*            the current line of marks (Sum Tally Counts)*         */ CSR00071
*/*       ELSE ignore the device counter values                      */ CSR00072
*/*    END-WHEN reference-mark-seen is indicated                     */ CSR00073
*/*  END-SELECT on the conclusion of the CSR device                  */ CSR00074
*/*             concerning the current scan line                     */ CSR00075
                                                                        CSR00076
```

FIG. 8(B)

```
                     SUM_TALLY_COUNTS
*/*  DO-FOR Each Counter across the scan line                        */ CSR00096
*/*     Add hdwr counter value to the totals counter                 */ CSR00097
*/*  END-FOR Each Counter across the scan line                       */ CSR00098
                                                                        CSR00099
```

FIG. 8(C)

```
                      CONVERT_COUNTER
*/*   Set the top threshold value that, if exceeded, indicates     */ CSR00118
*/*   something other than a mark was seen.                        */ CSR00119
*/*   Set the low threshold value that,if not met, indicates       */ CSR00120
*/*   something other than a mark was seen.                        */ CSR00121
*/*   DO-FOR each counter varying from first to right-most position */ CSR00122
*/*      IF counter greater than the low threshold but less than the */ CSR00123
*/*         high threshold                                         */ CSR00124
*/*         THEN set the bit in the Bit String to indicate a mark  */ CSR00125
*/*            detected.                                           */ CSR00126
*/*         ELSE reset the bit in the Bit String to indicate a mark was */ CSR00127
*/*            not detected.                                       */ CSR00128
*/*   END-FOR each counter varying n from 1 to right-most position */ CSR00129
```

FIG. 8(D)

```
                      DETERMINE_SKEW
*/*   IF the hardware counter indicates the skew is to be          */ CSR00180
*/*      bypassed                                                  */ CSR00181
*/*      THEN indicate skew is acceptable                          */ CSR00182
*/*      ELSE-DO check the skew                                    */ CSR00183
*/*         IF the skew mark has a value greater than the minimum  */ CSR00184
*/*            THEN-DO accept the counters                         */ CSR00185
*/*               Indicate skew is acceptable.                     */ CSR00186
*/*               Increment the skew counter                       */ CSR00187
*/*            END-THEN accept the counters                        */ CSR00188
*/*            ELSE Indicate skew is unacceptable.                 */ CSR00189
*/*      END-ELSE check the skew                                   */ CSR00190
                                                                      CSR00191
                                                                      CSR00192
```

FIG. 8(E)

```
                      CHECK_WHETHER_CONTROL_BAND
*/************************************************************************/ CSR00207
                                                                            CSR00208
*/*   IF band is a control band                                    */ CSR00209
*/*      THEN Save the control band.                               */ CSR00210
*/*         Indicate control band found                            */ CSR00211
*/*      ELSE Save in the Bit String.                              */ CSR00212
                                                                      CSR00213
                                                                      CSR00214
```

FIG. 8(F)

```
                    CHECK_CONTROL_SHEET
*/*    IF control sheet decision has not yet been made              */ CSR00229
*/*      THEN-DO determine control sheet                            */ CSR00230
*/*        Initialize pattern check variables                       */ CSR00231
*/*        DO-FOR each byte of the pattern                          */ CSR00232
*/*          Skip the type field on top and varification field on bottom*/ CSR00233
*/*            THEN-DO compare patterns                             */ CSR00234
*/*              IF the pattern does not match top-band             */ CSR00235
*/*                THEN-DO check bottom pattern                     */ CSR00236
*/*                  IF the pattern does not match bottom-band      */ CSR00237
*/*                    THEN add to bottom band variable             */ CSR00238
*/*                END-THEN check bottom pattern                    */ CSR00239
*/*              ELSE add to top band variable                      */ CSR00240
*/*            END-THEN compare patterns                            */ CSR00241
*/*        END-FOR each byte of the pattern                         */ CSR00242
*/*        IF the top band matches                                  */ CSR00243
*/*          THEN Indicate a Control Sheet is recognized.           */ CSR00244
*/*          ELSE-DO                                                */ CSR00245
*/*            IF the bottom band matches                           */ CSR00246
*/*              THEN Indicate invalid Control Sheet found.         */ CSR00247
*/*          END-ELSE                                               */ CSR00248
*/*      END-THEN determine control sheet                           */ CSR00249
                                                                       CSR00250
```

4,571,699

OPTICAL MARK RECOGNITION FOR CONTROLLING INPUT DEVICES, HOSTS, AND OUTPUT DEVICES

DOCUMENTS INCORPORATED BY REFERENCE

The following documents are incorporated by reference: Gary D. Schultz, "An Anatomy of SNA," *ComputerWorld/Extra*, Vol. 15, No. 11A; Mar. 18, 1981; pp. 35-38. M. R. DeSousa, "Electronic Information Interchange in an Office Environment," *IBM Systems Journal*, Vol. 20, No. 1, Spring, 1981, pp. 4-22.

CROSS-REFERENCE TO RELATED PATENT APPLICATION

Reference is hereby made to patent application, Ser. No. 220,635, now U.S. Pat. No. 4,463,417, filed on Dec. 29, 1980 by K. A. Bushaw et al. and titled "Modular Processor-Controlled Document Distribution Terminal." The subject application describes a noncoded input (NCI) data terminal including a facsimile scanner with multiple interfaces and multiple processors to control the data entry or scan, print and communication functions.

BACKGROUND OF THE INVENTION

1. Field of the Invention

The present invention relates to document distribution networks and particularly to a control mechanism for controlling the distribution of documents in a facsimile distribution system.

2. Prior Art

The use of facsimile communication systems for distributing documents is well known in the prior art. Such systems include one or more transmitting terminals, one or more receiving terminals, and a communication link interconnecting the terminals. Usually the transmitting terminal includes a raster input scanner which scans a document and generates a video stream of pixels representing the informational contents of the document. The video stream of pixels is digitized, imposed on a carrier signal, and transmitted via the communication link to the receiving terminal. A typical receiving station includes a demodulator which recovers the digitized data. The digitized data is utilized by a printer to reproduce a copy (facsimile) of the transmitted document. Facsimile communication systems operate either in a point-to-point mode or a distributive mode. When operating in the point-to-point mode, the transmitting terminal communicates directly with a receiving terminal. When operating in the distributive mode, data from the transmitting terminal is redistributed by other agents on a communication link.

To facilitate the control of data, the communication links have nodes or switching junctions. The nodes are usually coupled to host controllers, such as computers. The primary function of the host is to control the flow of data through the communication link and to ensure that the link operates at maximum efficiency. To this end, data are often stored at a host and transmitted at a more opportune time. Other well-known functions are performed by the host but will not be described because they are not germane to the present invention.

Substantial effort and cose have been expended to automate facsimile systems. Automation dictates that these systems function with a minimum operator intervention. To achieve this, the prior art has adapted several devices or techniques to control the systems. In one prior art technique, a coded information (CI) input terminal, such as a keyboard, is used to key controlled information into the system. Such control information includes recipient addresses, distribution commands, printing commands, scanning commands, etc. Although this approach works well for its intended purpose, it undermines the automatic philosophy because an operator is needed to enter the controlled information.

U.S. Pat. Nos. 3,594,495, 4,086,443 and 4,207,598 disclose another technique used in the prior art to automate document distribution. U.S. Pat. No. 3,594,495 describes a radio facsimile postal system including a device for transmitting signals representative of a written message and a radio facsimile recorder to receive the transmitted signals. The addressee is identified by unique code signals embedded in the transmitted signals. Each recorder is conditioned to respond to a different code signal. Therefore, the transmitted message will only be reproduced by the recorder which is conditioned to respond to the transmitted code.

U.S. Pat. No. 4,207,598 describes an automatic mail system wherein a television camera scans a document and the information is transmitted to a storage device in a telephone exchange. The identity of the addressee is sent to the exchange where it is deciphered and a path to the destination is set up automatically.

U.S. Pat. No. 4,086,443 describes the use of a job separation sheet which may be mark-sensed by a facsimile scanner to detect the address of the receiver.

U.S. Pat. No. 4,058,672 shows yet another example of the prior art control techniques. The patent discloses a data communication network where data blocks are placed in packets along with addresses and priority information. The communication network then transmits the packets in the most efficient way possible. Upon receiving the packets, the receiver puts the data message back together. Although the different automatic techniques described in the patents seem to be a step in the right direction, none of these techniques disclose or suggest a method wherein the sender controls the entire system.

SUMMARY OF THE INVENTION

It is therefore the general object of the present invention to provide a more efficient job control apparatus than has heretofore been possible.

It is another object of the present invention to provide a job control apparatus which enables a sender to control the entire document distribution system.

In accordance with the present invention, the above objects are accomplished by providing a document distribution control sheet having a plurality of control zones thereon. Each of the control zones is marked with information for controlling either the sending unit, the communication nodes or hosts, and the receiver. A mark-sensing device (including hardware or software) senses the marks on the document distribution control sheet and generates a bit stream representative of the marks thereon. Means are provided to extract and to decipher the bits which contain instructions for controlling the sending unit and the receiving unit. The information which controls the sending unit is used locally, i.e., at the sending unit, while the information for controlling the receiver is transmitted over the communicating network to the appropriate receiver. The bits containing instructions which control the node are encoded and forwarded over the communication link. Means are provided at the nodes to decipher the transmitted bits and to distribute the transmitted information (documents) in accordance with the transmitted instructions.

The foregoing and other objects, features and advantages of the invention will be apparent from the following more particular description of the preferred embodiment of the invention as illustrated in the accompanying drawings.

BRIEF DESCRIPTION OF THE DRAWING

FIG. 4(A) is a specific layout for one type of job control sheet.

FIGS. 8(A)–8(F) are modules of a psuedo-code program to control a microcomputer which assimilates the data generated by the hardware detection logic.

DESCRIPTION OF THE PREFERRED EMBODIMENT

Although the present invention can be used in any type of document distribution system, it works well with a facsimile type distribution system wherein the documents to be distributed are entered by a noncoded input terminal such as an optical scanner. The invention will be described in this environment, but this is not to be construed as a limitation on the scope of the present invention since it is intended that the invention can be adapted for use in any system where data to be transmitted is inputted at an input point and distributed over a communication link to one or more remote users.

Figure 1:
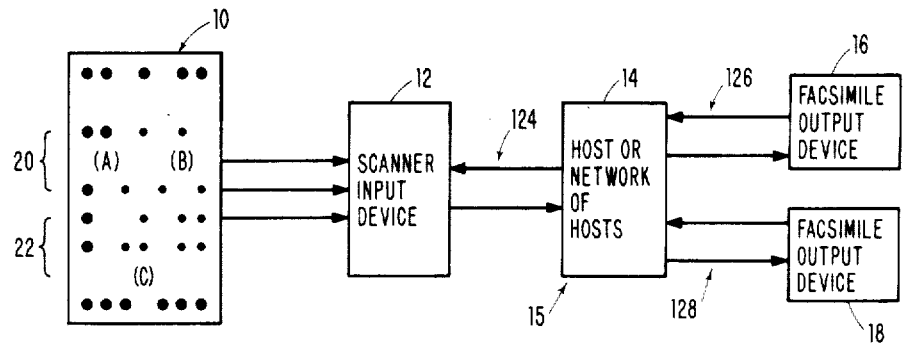
FIG. 1 is a block diagram of a document distribution system with a job control sheet according to the teachings of the present invention.

In FIG. 1, a block diagram representation according to the teaching of the present invention is shown. A control sheet 10 contains a plurality of prerecorded marks and user-generated marks. The marks on the control sheet are used to control an input device 12, a host or network of hosts 14, and facsimile output devices 16 and 18. The input device 12 is a conventional facsimile optical scanner such as that described in U.S. Pat. No. 4,086,443 or the cross-referenced patent. Both patents are incorporated herein by reference. The scanner 12 scans information recorded on the job control sheet or card 10 and generates a plurality of bit streams representative of the informational contents of the sheet. The control information A and B, which is recorded in zone 20 of the control sheet, is used to control functions in the scanner 12 and the facsimile output devices 16 and 18, respectively. The control information recorded in zone 22 of the control sheet is used to control functions in the hosts 14.

By way of example, the information (identified by A) is used for controlling the scanner 12. The information identified by B and C control the network hosts 14 and the output terminals 16 and 18 respectively. To this end, A is designated in proximity to the scanner while B and C are designated next to hosts and output terminals. Data from the scanner 12 is transmitted over communication links 124 to the hosts 14 at network node 15. Similarly, information from the hosts is transmitted over communication links 126 and 128, to facsimile output devices 16 and 18. It should be noted that information is transmitted from the input device to the hosts and from the hosts to the output device. In a point-to-point communication link, data from scanner 12 is directed through the link to one facsimile output terminal. By preceding each document or group of documents (not shown) to be distributed with an appropriately marked control sheet 10, the user via the user marks can effect batch document input to the distribution network, control device and host functions in the network, and the distributed batch output across the network. The details of the job control sheet, together with the necessary hardware devices and software algorithms which are used to process the control information recorded on the control sheet, will now be described.

1. The Control Sheet

Figure 3:
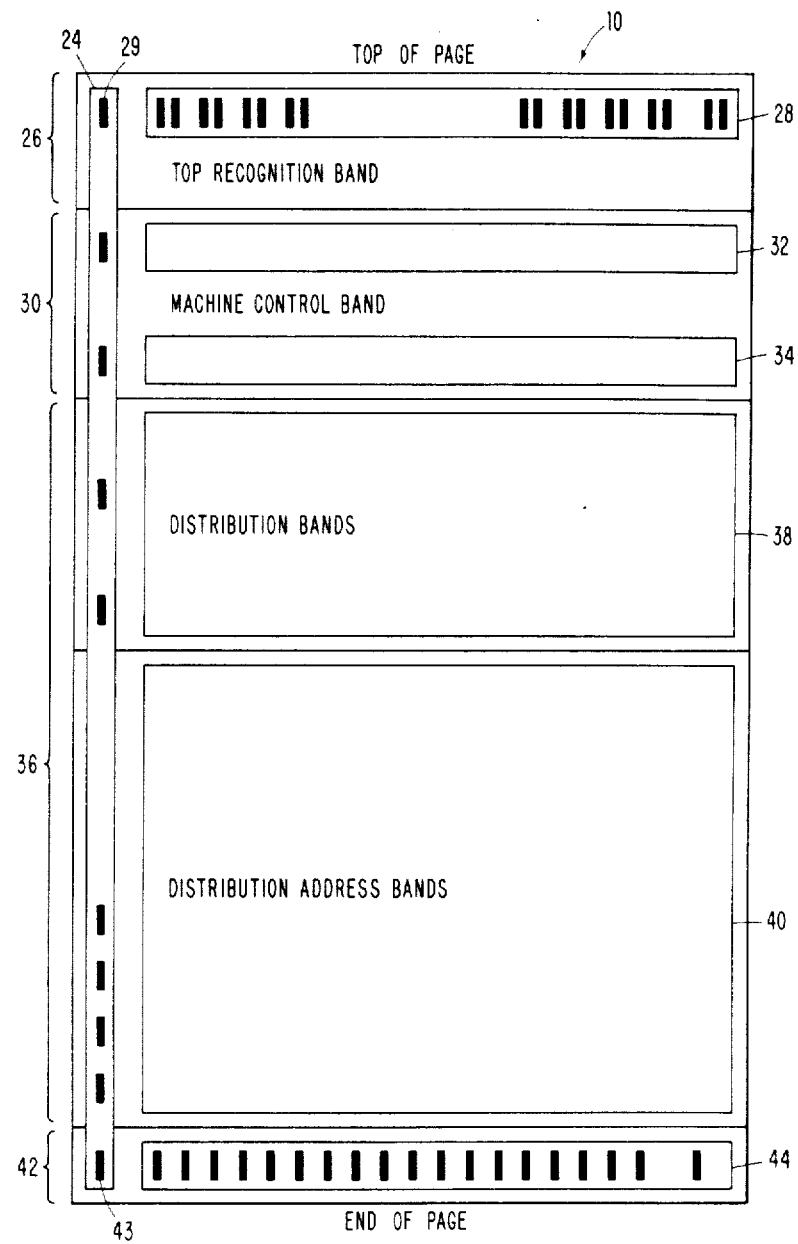
FIG. 3 is an illustration of the general layout of a job control sheet.

In FIG. 3, the layout of the control sheet 10 is shown. The function of the control sheet is to convey control information to the work station (input and output devices) and to the document distribution nodes. By way of example, functions that may be controlled for the input device are as follows: coarse or fine scan, size of paper, encrypt, etc. Similarly, functions that may be controlled for the output device are image width, white margin, decrypt, etc. Functions that may be controlled for the distribution nodes are distribute, file, obtain, etc. The sheet is logically divided into control areas. Each control area is fitted with markable locations. The locations are marked with control information which is sensed and is used to control a physical section of the distribution system. Each control area is divided into one or more horizontal control bands which extend from left to right on the sheet. The control sheet comprises a fixed grid of markable positions. A column of reference marks 24 is disposed on the left-hand edge of the control sheet. Each row of mark-sensed position is identified by one of the reference marks on the left-hand side of the sheet. As will be described hereinafter, presence of a reference mark indicates to the recognition hardware and recognition microcode that there is a row of marks extending from the left to right which has to be processed for control information. Stated another way, the presence or absence of a mark in column 24 indicates the presence of absence of a row of markings.

Although the areas on the card can be changed without departing from the scope of the present invention, in the preferred embodiment of this invention, the area of the card identified by numeral 26 is referred to as the top recognition band. The recognizable information in this band is mark-sensed in row 28. As stated before, the presence of row 28 is indicated by the reference mark disposed in column 24 and identified by numeral 29. The presence of this mark indicates to the recognition hardware and microcode (to be described hereinafter) that there is additional information in the row to be extracted. The information is embodied in the markings. The information in row 28 is recognized and analyzed by the recognition logic (to be described hereinafter) in the input device. The mark-sensed information in the top recognition band 26, and in the top recognition row 28 particularly, indicates that the sheet represents a control sheet rather than a data sheet. Also, the control-sheet type is included in the recognition row 28. Although it is within the skill of the art to devise a plurality of types of control sheets, in the preferred embodiment of this invention, there are four types of control sheets.

The first type is a "document control sheet." This sheet is always the first page of a document to be transmitted. Its function is to indicate to the work station, the machine controls, and the document distribution node, the control parameters and addressing information to be used in document transmission.

Another type of control sheet is a "continuation control sheet." This type, when used, follows a document control sheet. Its purpose is to provide the sender with additional address specification areas. The control-sheet type field must be filled in, either manually or pre-printed if this type of control sheet is used. One or more continuous control sheets may follow immediately after a document control sheet.

Another type of control sheet is a "work station control sheet." This type of control sheet is used to request work station services. The work station type sheet will be processed by the work station without involvement of any other work station or document distribution node. All current documents send/receive operations will be terminated prior to the processing work station type control sheet requests. An example of this type is the encryption type. The encryption type can be used to enter or change the cipher keys of a related keyboard.

Still another type of control sheet is a document distribution node control sheet. This type of control sheet is used to request document distribution mode services.

As shown in FIG. 3, the next band in sequence from the top of control sheet 10 is the machine control band 30. This band is used by the sender to indicate the work station control parameters required for scanning and printing. Although a plurality of rows performing different types of functions can be positioned within this band, in the preferred embodiment of this invention, the machine control band is divided into two rows. Each row is identified by a recognition mark in recognition column 24. The first row 32 is used to control the setup control parameters for the sending unit or scanner. The types of information which are marked in this row are resolution scan size, secure (encrypted) and darkness, etc. Control information for the output device such as a printer is marked in row 34 of the machine control band.

The document distribution node control area is identified by numeral 36. This area contains marked information which is to be utilized by the document distribution node. The input scanner and associated control have the responsibility of recognizing the presence of marks or no marks in this area and present a corresponding bit stream representative of the mark or no mark condition to the document distribution node. As will be described hereinafter, the transmitted string of bits is processed by the host software algorithms in the network nodes and is used for performing routing functions in the distribution system. The document distribution band area is divided into the distribution control bands 38 and distribution address bands 40. The distribution control band 38 includes one or more rows of information. As before, each row is identified by a recognition mark in recognition column 24. The distribution control band 38 is used by the sender to provide instructions to the document distribution node. By way of example, the distribution bands may contain format identification used to identify the mask or table required to translate each marked position. Delivery and transmission requirements, such as confirmation of delivery and classification of, personal, confidential and priority information can be placed in this band. Print output requirements and sender and document identification data can be included in this band.

The distribution address band 40 contains the auxiliary hand-written on typed names or organizational designations of the document recipients. The operator at the receiving work station must read these names in order to deliver the received document to each of the recipients associated with that work station. The distribution network addresses of the recipients are indicated by user marks which are recognized by the work station and sent to the document distribution node for interpretation. As before, each of these information items is recognized by recognition mark in the recognition zone 24. The addresses may be indicated individually or as distribution list names or a combination of both. As is used in this application, the distribution list name identifies a previously defined collection of destinations, addresses and document recipients stored in the document distribution node.

The bottom recognition area identified by numeral 42 is contiguous to the document distribution area 36. It contains a band of marks identified by numeral 44. These marks are analyzed and recognized by the input device. The last mark identified by numeral 43 in row 44 is identical to the first mark identified by numeral 29 in row 28. This correspondence allows a system to recognize a sheet as a control sheet even if the sheet is inserted upside down. (However, if the control sheet 10 is inserted upside down, the system will not process the sheet and the operator will be informed accordingly.)

FIG. 4(A) shows a specific layout for a document control type sheet. In normal operation of the facsimile distribution system, this sheet is appended to one or more documents to be distributed. The sheet is the first to be scanned by the scanner, processed and transmitted in the network system. The data extracted from the sheet controls the distribution of the appended documents. The sheet is scanned from top to bottom and left to right. As stated before, the sheet comprises a reference mark area 46. The mark in this area informs the recognition hardware and associated algorithm that there is additional information to be extracted from the row which is associated with a specific reference mark. The first horizontal row of data on the sheet is identified by numeral 48. This row is referred to as the recognition row or recognition band. The information in this band informs the system that the sheet is a control sheet. Likewise, the information in bottom recognition band 50 informs the system that the sheet is also a recognition sheet. Reference mark 52 indicates to the system that there is an associated row of marked information which has to be sensed and processed. Mark 54 indicates to the system that the additional mark in the row contains control information for controlling the scanner. Similarly, marks 56 and 58 would be translated into control parameters for driving the scanner. Marks 60 and 62 inform the scanner that there is associated control information to be processed on the sheet. Mark 64 informs the system that the information associated with that row is to control the output device such as a printer. Mark 66 contains the type of control information which is transmitted to the printer. It should be noted that the marks in column 46, rows 48, 50 and in area 53 all have different sizes (heights and widths). The difference in size is used by the mark sense controller (to be described below) to identify the marks. To this end, it is preferable that the marks be prerecorded.

The area of the sheet between reference marks 62 and 68, respectively, is ignored by the scanner because there is no recognition mark in that area. The area of the sheet between marks 68 and 70 is processed by the scanner. In one embodiment of the present invention, those areas are left blank and can be filled in by an operator. By way of example, the blocks 72, 74 and 76 are reserved for addressees who should receive the documents to be transmitted. The location code and extension/list are filled in by the operator. By way of example, if the operator desires the document to be transmitted to a set of receivers whose names are identified in block 72 and reside in Boston and Dallas, the operator would fill out the card as shown. The extension/list would also be filled out. It should be noted that with this specific type of form, the name of the receiver and the location are free-formatted. This means that the operator can fill in the information into grids designated on the form. If the set of receivers recorded in block 74 is in Pittsburg and some distribution lists are disposed at the distribution node, then the form is filled out as shown. If the receivers recorded in space 76 were in Los Angeles and Miami, the form would be filled out as marked. The prerecorded information is used by the recognition hardware and microcode which will be described subsequently. However, the name of the parties who receive the document and the location to which the document is sent can be filled in by the sender. The entire form can be free-formatted i.e., prepared by a user, or prerecorded, prepared by a machine without departing from the scope of the present invention.

In summary, the above-described job control sheet is fitted with a plurality of dedicated control areas. Each control area contains a plurality of bands or rows of information which contain control information for controlling the scanner (sending unit), the printer (receiving unit, and the network (nodes) over which the document is routed for distribution.

2. The Mark Sense Controller (a) Mark Detection Hardware Logic Means

Figure 2:
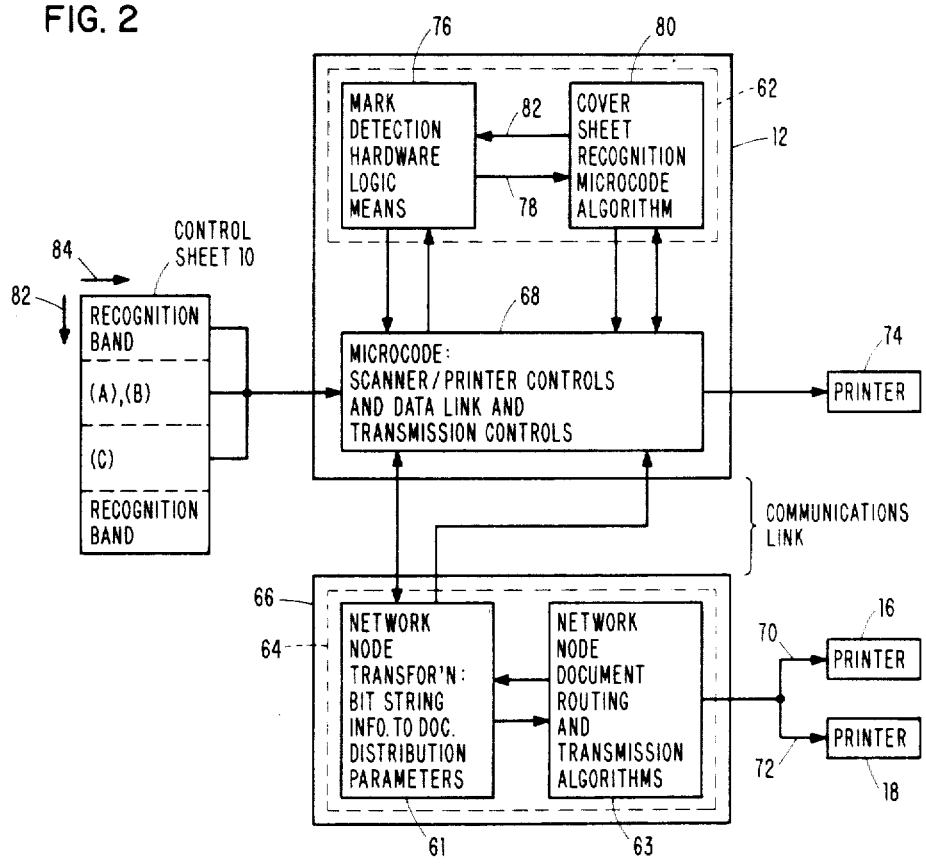
FIG. 2 is a block diagram of the components used to process the marked sense indicia on the job control sheet.

FIG. 2 shows a block diagram of the components used to process the indicia on the job control sheet. The components include a mark sense recognition means 62. The mark sense recognition means 62 is placed within the input device 12. A document distribution control means 64 is disposed at the node 66 of the document distribution network. In the preferred embodiment of the invention, the input work station 12 is a noncoded input terminal. The terminal includes a conventional optical scanner and controls 68. The scanner can be of the type described in the above-referenced patent application assigned to the assignee of the present invention and is incorporated herein by reference, or the scanner described in U.S. Pat. No. 4,086,443 which is also incorporated herein by reference. Since the scanner and controls are conventional, the details will not be described. The scanner includes printer controls, data link and transmission controls coacting under the control of microcode to scan a document, buffer a stream of zeroe and one bits in a buffer (not shown). The bits represent the informational contents of the scanned page. To this end, the control sheet 10 is placed with the optical marking facing the scanning elements of the scanner. As bits are placed in the scanner buffer, the mark sense recognition means 62 transfer a scanned line of data over conductor 78. By examining the bits recorded in the recognition bands of the control sheet, the mark sense recognition means determines whether or not sheet 10 is a control sheet or a data sheet. If it is a control sheet, the information in zone A and B of the sheet is deciphered in the mark sense recognition means 62 and is used for setting parameters of the scanner and remote printers 16 and 18.

Likewise, information in zone C of the control sheet 10 is formulated into a bit stream by the mark sense recognition means and is transferred over the communication link to document distribution control means 64. The document distribution control means 64 (to be described hereinafter) analyzes the transfer data and formulates meaningful parameters for distributing the data to the appropriate receiving station 16 or 18. In the preferred embodiment of this invention, the distribution control means 64 includes a plurality of software algorithms. By way of example, the software algorithms of block 61 transform some of the transmitted bit strings into document distribution parameters. Likewise, the software algorithms of block 63 control the network node document routing functions. It is within the skill of the art to use hardware and/or other types of software without departing from the scope of the present invention. Data is transferred over conductor 70 and 72 to the respective receiving terminal. At the terminal, the printers are controlled by parameters which are extracted from the control sheet in mark sense recognition means 62 and transmitted over the communication channel and through the node 65 to the appropriate printer. Data transmitted frm other input units to input unit 12 is printed out on printer 74. It is worthwhile noting that other types of conventional network devices and controls are positioned at node 66. Since those devices are conventional, details will not be given. By way of example, an article entitled "An Anatomy of SNA" by Gary D. Schultz and published at pgs. 35–38 *Computer World/Extra* describes a communication system with a network node with conventional data processing and routing device. The article is incorporated herein by reference and can be consulted for details of the conventional elements.

In the preferred embodiment of this invention, the mark sense recognition means 62 comprises mark detection hardware logic means 76 coupled over conductor 78 to cover sheet recognition microcode algorithm 80. Controlled information from cover sheet recognition microcode algorithm 80 is trasmitted over conductor 82 to the mark detection hardware logic means. The mark detection hardware logic means acts as an assistant to the cover sheet recognition microcode algorithm to determine whether a given scanned document is or is not a control sheet. Once a given document is determined to be a control sheet, the mark detection hardware logic means continues to detect and read mark information from the page. The logic keeps track of what it sees on the page in a horizontal dimension. It does not make a decision on whether or not it saw valid marks on the page. It keeps a tally of how many black PELs (picture elements) it sees as it scans across valid mark areas. This tally is stored into memory for the software to examine. Software uses this tally result along with the counts from other scans, if necessary, in order to make mark decision.

Figure 10:
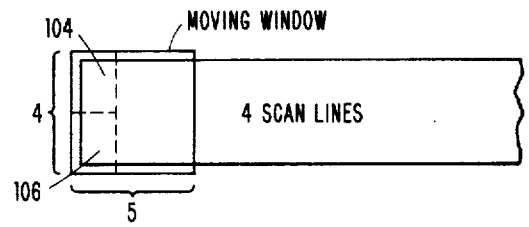
FIG. 10 is an illustration of the scanning window sections.
Figure 11:
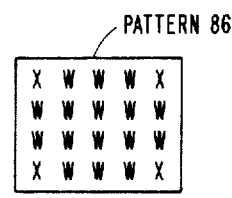
FIG. 11 is an illustration of a pel pattern.
Figure 6A:
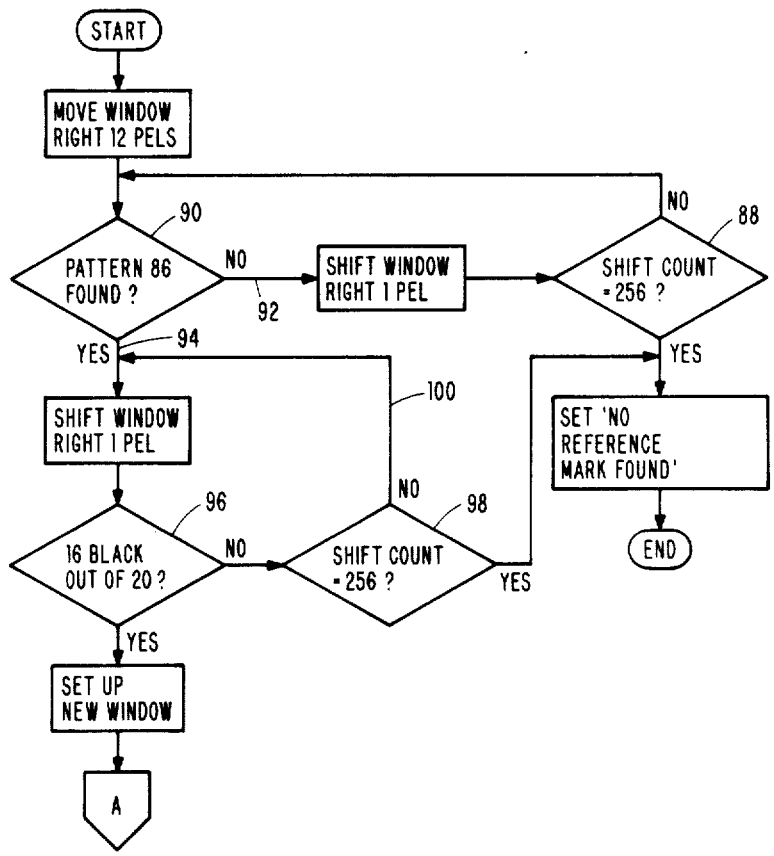
FIGS. 6(A) and 6(B) are flowcharts of the pel count logic.
Figure 6B:
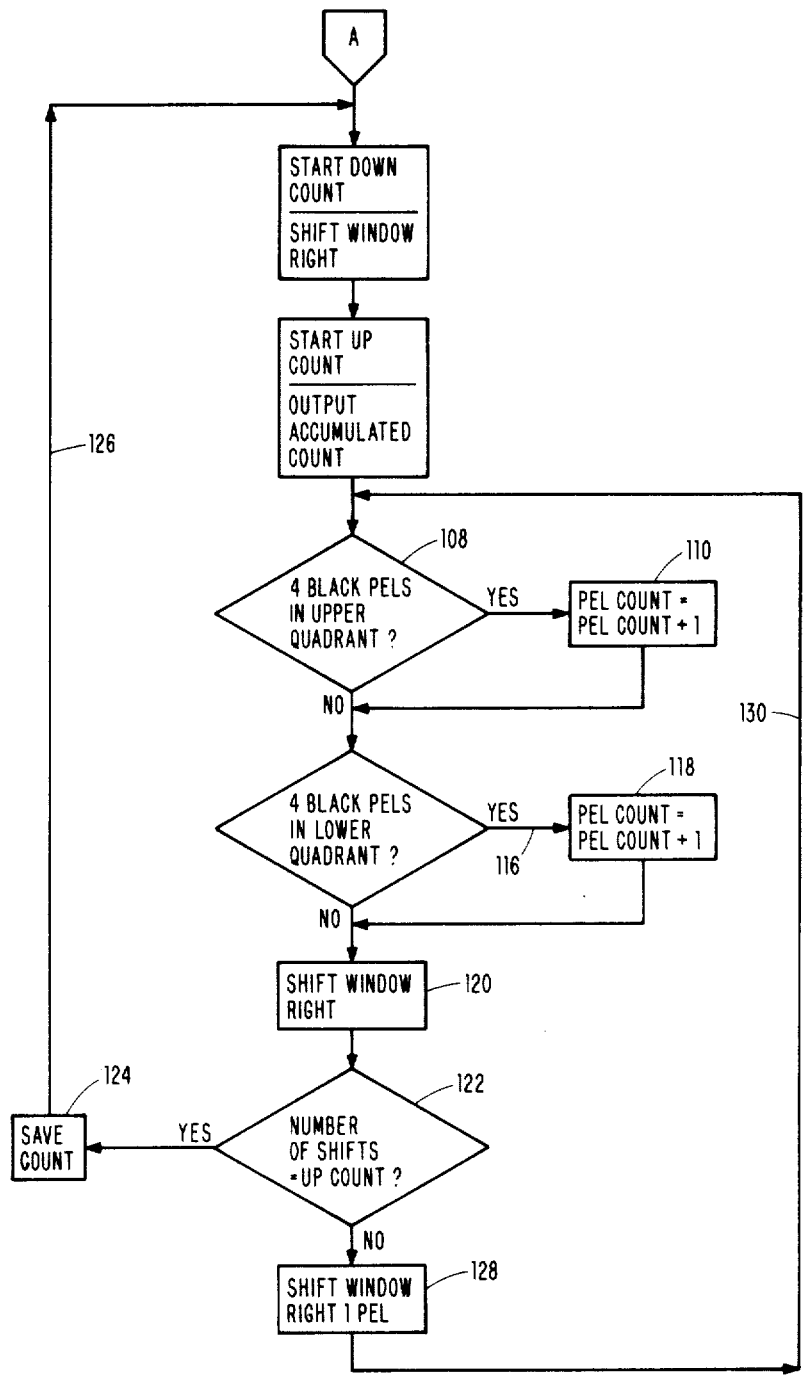

Before the components in mark detection hardware logic 76 are described, a logical description of the process steps utilized by the logic to determine the presence or absence of a mark, will be given. FIGS. 6(A) and 6(B) show a graphical representation of how the logic operates. The control sheet 10 (FIG. 2) is scanned by scanner 12 in the direction shown by arrows 82 and 84, respectively. In other words, the sheet is scanned from top to bottom and left to right. The bit stream representative of the informational contents of the page is loaded in sequential order in the buffer (not shown). After four scan lines have been accumulated, the logic 76 (FIG. 6(A)), in processing the data, shifts four scan lines from the scanner buffer (not shown) into its own buffer. A moving window (preferably a 4×5 shift matrix) is moved over the buffered lines. It is shifted right 12 PELs and then checks for the pattern identified by numeral 86 illustrated in FIG. 11. This pattern is a nearly solid white block. If the white block is not found, the window shifts one PEL to the right and tests again until the contents of the shift counter are equal to 256. If the contents of the counter are 256 (test block 88) and the test pattern is not found, a mark sense counter is set with a bit which indicates no reference mark was found. If, however, the shift count is less than 256, the test is performed (block 90) to see if the pattern is found. If the pattern is not found, the program loops along path 92 in blocks 88 and 90, respectively. If the pattern is found, the program proceeds along path 94 and shifts the window right one PEL and examines for another pattern indicated by block 96. The pattern in block 96 is any 16 black PELs out of a possible 20 black PELs. Stated another way, the program is now looking for an area at least 75% black. The program then checks to see if the contents of the shift counter are equal to 256 (block 98). If so, the program ends and sets the no reference mark found in the reference mark counter. If the counter is less than 256, the program tests for the pattern (that is, black) block 96. If it is not found, the program loops along path 100 and between blocks 98 and 96 until the pattern is found. Once the pattern is found, the size of the moving window which is used to determine the presence or absence of the reference mark, is changed. The new window is two vertically adjoining shift matrixes identified by numerals 104 and 106 in FIG. 10. In the preferred embodiment of this invention, the size of that matrix is 2×2.

In FIG. 6(B), a software program then starts a down count and shifts the new windows one PEL position right for each count. The total count is equivalent to the position where the other reference mark is located on the identified row. Stated another way, once a reference mark is identified in column 46 (FIG. 4), a count is generated in a counter. The counter is equivalent to the PELs (picture elements) required to move the window from the reference mark to the first mark area on the row. The count is referred to as a "down count." When the count is completed, the program starts an "up count." The accumulated count, which is zero the first time, is outputted. The test in block 108 is then performed. The test requires that there is four black PELs in the upper quadrant of the new matrix 104. If there are four black PELs, the PEL count is incremented by one (block 110). The program then checks to see if there are four black PELs in the lower quadrant. If there are four black PELs, the program traverses along path 116 into block 118. In block 118, the PEL count is incremented by one and the window is shifted right (block 120). The window is shifted right also if there are fewer than four black PELs in the lower quadrant. The hardware assist program then proceeds into block 122.

In block 122, the program tests to see if the number of shifts equals the "up count." If it does, the program saves the count, block 124, and traverses along path 126 to start down count and shifts the windows during the down count interval. If the number of shifts is less than the contents of the up count (block 122), the shift windows 104 and 106 are shifted one PEL to the right (block 128). The program then traverses path 130 to block 108. The above-described routine continues until the end of the scan line is reached and then the program stops the hardware. The end of a scan line is reached when a predetermined number of PELs has been processed.

The hardware remains in the stop mode until it is restarted by the hardware microcode. To start the hardware, the microcode sets a control bit in a control register. Whenever the hardware completes the above-described routine, the bit is reset.

In essence, the mark sense hardware and its associated microcode (mark detection hardware logic means 76, FIG. 2) senses for a reference mark which is disposed on the left side of the control sheet. The logic locks onto the mark by observing a solid white area followed by a substantially black area. Once this determination is made, a relatively small matrix window moves across the horizontal line or horizontal row to determine marks. The digital representation of those marks is tallied and is placed into memory where it is accessed by the cover sheet recognition microcode algorithm 80. The algorithm will be fully described hereinafter. The microcode algorithm generates meaningful control parameters from the tallied counts.

Figures 4B, 5:
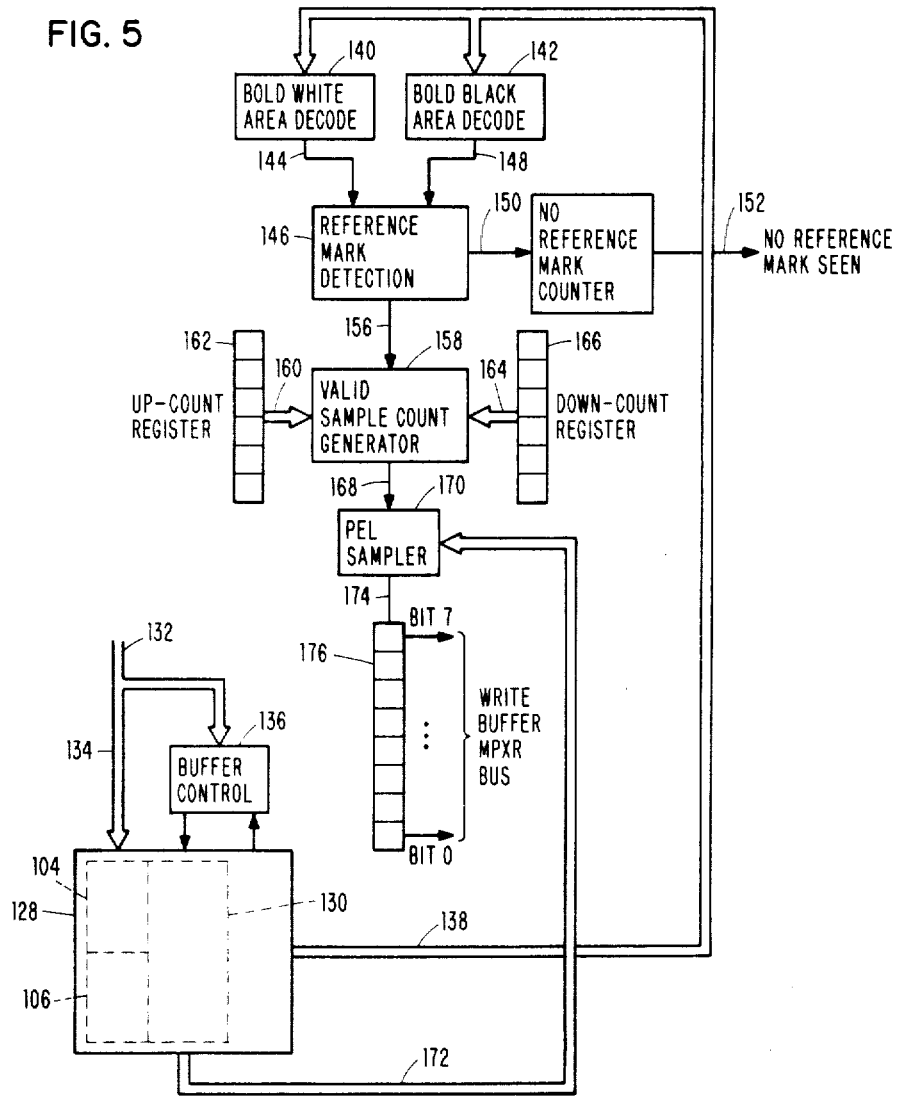
FIG. 4(B) is a schematic for explaining a procedure to identify the skew associated with a sheet.
FIG. 5 is a block diagram of the hardware detection logic.

In FIG. 5, a block diagram of the hardware components of the detection hardware logic means 76 (FIG. 2) is shown. The hardware includes a buffer 128. The buffer stores the scan lines of data which are operated upon by moving windows 130, 104, and 106. Data (that is, scan lines) are conveyed over conductor 132 and 134. Data for buffer 128 are obtained from the regular scanner buffer. When the matrix window 130 is scanning buffer 128, the output from buffer 128 is coupled over conductor or bus 138 into solid (bold) white area decoder 140 and black area decoder 142. Twenty of the transmitted bits are transferred into the substantially black area decoder 142 and 16 of the transmitted bits are transferred into solid white area decoder 140. Buffer 128 is controlled by buffer control unit 136. The function of bold white area decoder 140 is to decode the 16 bits coming in to determine whether or not there is a bold white area. Similarly, the function of bold black area decoder 142 is to decode the 20 bits coming in to see if a bold black area follows the bold white area. It is worthwhile noting that the 16 and 20 bits are those generated from the relatively wide matrix window 130.

The output from the white bold area decoder 140 is coupled over conductor 144 into reference mark detection 146. Likewise, the output from bold black area decoder 142 is coupled over conductor 148 into the reference mark detection 146. The function of the reference mark detection 146 is to detect the reference mark.

One of its outputs is coupled over conductor 150 into the "no reference mark counter." The output from the "no reference mark counter" is fed over conductor 152 to inform the logic assist microcode that no reference mark is found. The other output from the reference mark detection 146 is coupled over conductor 156 to valid sample count generator 158. The valid sample count is used to determine up and down counts with software settable counts. The valid sample count generator 158 is controlled by information on bus 160 from up-count register counter 162 and information on bus 164 from down-count register counter 166. As stated before, the up-count register counter and the down-count register counter are loaded by the hardware assist microcode. The output from the valid sample count generator 158 is fed over conductor 168 into PEL sampler 170. Up to eight PELs can be inputted into PEL sampler 170 over conductor 172. The eight PELs are generated from the 2×2 matrix windows 104 and 106. The output from PEL sampler 170 is coupled over conductor 174 into tally counter 176. The tally counter is an eight-bit counter and its output is fed over a write multiplexor bus into a shared memory (not shown). The tally count which is written into the shared memory is accessed by the cover sheet recognition microcode algorithm 80 (FIG. 2) to determine the presence or absence of a mark on the sheet. This cover sheet recognition microcode algorithm 80 will be described shortly.

In operation, the scanner adapter is the first hardware to be started. It will place the scanned data into the buffer associated with the scanner. When four or more lines have been placed in the scanner memory, the mark detection hardware logic means (FIGS. 2 and 5) is started. Mark sense will fetch those four scanned lines and store them in buffer 128 (FIG. 5). The mark sense will not be started again until at least four more lines have been scanned. By moving the matrix 130 over the buffered lines, a snapshot of the scanned page which covers an image area of four scan lines high by five PEL locations wide is examined. This allows the detection of bolt white or black image areas and allows PEL densities to be counted over four scan lines simultaneously. The bold white area decode 140 is a 16-logical AND function which examines the complements of the 20 bits from the matrix 130. The bold black area decode 142 examines all 20 bits. A given number of missing bits is allowed. This enables detection of bold black areas that are less than 100% black, such as picture mode data.

The mark sense process starts by the microcode setting the RUN bit in a control register (not shown). The hardware disregards the first 12 PELs and then starts looking for the reference mark. A reference mark is found when one or more bold white areas are followed by at least one bold black area. The bold area samples occur once each window shift cycle or once each time data shifts one PEL position. Once the bold white area followed by the substantial black area is found, the valid sample time generator 158 is turned on. The up-count of the generator output acts as a gate which allows the tally counter 176 to count. The down-count stops the counter and the count information is transferred to a temporary register (not shown), then to a designated area in the shared memory. This area is accessible to the cover sheet recognition microcode algorithm 80 (FIG. 2) which will be described hereinafter. The following up-count start clears the counter so that another count can be made. During the next up-count, the data in the register is written in time share memory. The up-count from the generator only occurs in valid mark areas. Immediately following the detection of the reference mark, the generator starts its downtime count. The generator is implemented with two shift registers (non-binary) counters and two registers which are loaded by software. The down counter runs first, the the up counter, and so on.

During the up-count (valid time) the PEL sampler operates. The tally counter 176 will count only if PELs are seen. Actually, the tally counter only increments when both in valid time and when PELs are detected in clusters of four (2×2). These minor bold area decodes assure that specks and smudges will add little or no significance to the tally counts. Each cluster area (one 2×2 area above another 2×2 area) is sampled during each machine cycle. The clusters shifts one PEL position before they are each sampled in the next cycle. The overall effect is that the tally count is equal to half the actual bit count minus one. The two clusters are decoded from the two leftmost columns of the larger five-wide, four-high matrix identified by numeral 130. At the beginning of each scan, the "no reference mark counter" is turned on. If the counter times out before a reference mark is detected, the logic stops and resets. The counter times out when it reaches 256 PEL counts.

(b) Cover Sheet Microcode Algorithm

When the mark detection hardware logic means 76 (FIG. 2) completes processing a band or row of marks on the control sheet 10, it interrupts the cover sheet recognition microcode algorithm 80. The microcode algorithm 80 then processes the marks. The cover sheet recognition microcode algorithm 80 will hereinafter be referred to as the cover sheet recognition interrupt handler. In essence, the microcode interrupt handler is a software program which resides in an interrupt driven type microprocessor. The microprocessor may be a dedicated processor or the program could be a subprogram in a microprocessor which performs functions other than processing the marked information on the control sheet. Also, types of conventional processors other than interrupt-driven type processors may be used for processing the data.

The cover sheet recognition interrupt handler (software) is entered upon the occurrence of an interrupt from the control sheet recognition hardware. Its functions are to accumulate the results of the control sheet recognition hardware, to recognize valid and invalid control sheets, and to produce a bit string of the marks of valid control sheets. It distinguishes between marks intended to control the scanner and the receiving printer and marks intended to control the distribution of the document. The marks which are intended for controlling the scanner are extracted and are formulated into parameters. The parameters are used by the conventional scanner control mechanisms to control the scanning of the documents. The marks intended to control remote printers are extracted, formulated into usable parameters, and forwarded (that is, transmitted) through the network to the appropriate printers. The transmitted parameters are used by the conventional printer controls to reproduce the documents. Marks intended for controlling the distribution of the document are simulated into bit streams with appropriate headers and forwarded to the nodes. At the nodes, additional software handlers (to be described hereinafter) converts the control bit stream into meaningful parameters which are used to route the documents to their appropriate destinations. It should be noted that the control sheet recognition is a continuous control process driven by hardware interrupts. The control sheet recognition process is controlled by the presence or absence of a reference mark positioned along the left margin of control sheet 10 (FIGS. 3 and 4). If the reference mark is found by the mark detection hardware logic means 76 (FIG. 2), the horizontal band or row with the reference mark is monitored and a set of counts representative of the PELs detected in the marked areas is generated. If the reference mark is not seen within approximately one inch of the left edge of the control sheet, the line is skipped and no counts are accumulated. The counts produced by the hardware are thresholded and, if between certain minimum and maximum values, are translated into a logical "1" bit for a mark position or a logical "0" bit for an unmarked position. The thresholded values used are different for different types of marked positions on the control sheet. For instance, the values used for thresholding a top recognition band mark are different from those values used in working with a user mark.

FIG. 8(A) shows the main program which is used to accumulate the results of the mark detection hardware logic means 76 (FIG. 2). The program includes a plurality of subroutines which are shown in FIGS. 8(B)–8(F). The program is written in a high level structured format. This format is well known to those having ordinary skill in the programming art and therefore each step of the program will not be described. The program is initiated by an interrupt signal from the mark detection hardware logic means 76 (FIG. 2). This step is indicated in FIG. 8(A) by the instruction identified by numeral CRS00041. The next step in the program is identified by numeral CSR00042. This step is a select instruction. The select instruction is a case statement which introduces several different alternatives. It should be noted that the first step of the program CSR00042 ends with the end select statement identified by instruction number CSR00074. There are two alternatives which follow the select statement. The first alternative is the "when" alternative beginning at the instruction line identified by CSR00044. If the statement is true, that is, no reference mark was found on the current line, the program performs a step beginning at CSR00045, ending with the end-when statement identified by instruction number CSR00067. If reference mark was found (instruction number CSR00044), the program goes to instruction number CSR00068. There it tests to determine whether skew of the scanned line is acceptable (instruction number CSR00069). It then performs the function identified by instruction CSR00070 through the end-when statement CSR00073.

As stated before, there are several subroutines in the program. Each of these subroutines will be identified and the corresponding figures which show the subroutine programs will be described. The first subroutine in the program is the determine skew subroutine CSR00055. The program steps for this routine are given in FIG. 8(D). The function of this subroutine is to determine if the skew of the control sheet is within acceptable limits. In other words, this function determines whether or not the counter values supplied by the control sheet recognition hardware can be used for mark determination. The underlying test is whether the page is skewed in relation to the travel of the scanner. The rightmost counter returned by the device represents a skew mark. If the scanner is currently within a reference mark, a minimum value in the skew mark counter indicates that the counter value is representing the marks located between the reference mark on the left-hand side of the control sheet and the skew mark on the right should be valid. If the counter value is less than a specified minimum, there is a less than optimum chance that the counter values for the other marks on that line are valid. In essence, the relationship between the reference mark on the left and skew marks (in column 51) on the right of the control sheet are used to determine the skew of the sheet.

The pattern of marks in FIG. 4(B) represent a row of information marks to be scanned by a linear scanner. Marks A and C are used to define a scan window. If marks A and C cannot be detected during the same linear scan by the scanning system, the document is skewed relative to the scanner to an extent that the information marks B cannot be reliably read. In operation, the scanner accumulates a quantity of black for all of the marks A, B, and C in the row being scanned. When the A mark is no longer detected, the scanning system determines how much black has been sensed from the C mark. If the quantity detected exceeds a threshold of 80% (other thresholds might be used), then the scanner knows the skew is small enough that the scanner will have also sensed the B marks if any. The scanner then checks for the presence of accumulated black in other portions of the row indicative of the presence of a B mark. In effect, the dimension lines 11 and 13 between the edges of the A and C mark define an acceptable skew window. The size of the skew window is dependent upon the size of the A and C marks and their distance apart. The A and C marks might be placed on each row to be scanned or they might be placed at the first or topmost row of a document. It should be noted that the A mark is recorded in reference mark area 46 (FIG. 4(A)) and the C mark is recorded in column 51 (FIG. 4(A)). Also, the B marks are in the same row with the A and C marks and intermediate said A and B marks. It should be noted that the physical size of the marks are exaggerated for purposes of description.

In this case, an indicator flat is set to prevent the mark detection hardware logic means 76 (FIG. 2) processed from using any more of those values. For each line received with a counter value above a certain minimum, the values of the other counters are used for that line. However, if the counter value of the skew mark does not meet that minimum requirement, the counter values are assumed to be unreliable. As a further check of tolerable skew on the cover sheet, a skew counter is kept. The counter is incremented each time the counter value of the skew mark exceeds the threshold. If the counter has not exceeded a predetermined value, the page is not skewed. The top and bottom recognition bands have another control mark to specify that the skew determination is to be skipped. These bands have marks which differ from those of the user and machine control bands thereby allowing detection without the need for skew determination.

The program (FIG. 8(D)) begins with the IF statement (CSR00180). If the hardware counter indicates the skew check is to be bypassed, the program indicates a skew is acceptable (CSR00182) and the program goes back to the main program in FIG. 8(A). In the event that the skew check is not to be bypassed, the program performs a skew check defined by program steps CSR00183-CSR00190.

The other subroutine in the main program shown in FIG. 8(A) is the convert chamber subroutine identified by program step CSR00059. The convert counter subroutine is given in FIG. 8C. The convert counter subroutine converts the total counters into a bit stream that corresponds to the marked and unmarked positions on the lines or rows of marks on the control sheet 10 (FIGS. 3 and 4(A)). The counters are examined one at a time in the conversion process. The conversion process consists of comparing a counter value against two thresholded values: a minimum thresholded value and a maximum thresholded value. The counter that falls within the prescribed check values results in a 1-bit into stream. If the counter does not fall within the prescribed check value, the counter is converted to a 0-bit.

The first instruction in this program is identified by CSR00118. In this instruction, the program sets the top threshold value that, if exceeded, indicates something other than the mark was seen. The instruction CSR00120 sets the low threshold value that, if no met, indicates something other than the mark was seen. Once the conditions are set up by the program, the first instruction is a DO-FOR instruction identified by numeral CSR00122. This DO-FOR instruction is applied to all marks beginning from the first mark right of the recognition mark for a particular line until all the marks in the line are accounted for. The subroutine ends with the instruction CSR00129. In other words, for each mark, the tally count outputted from the mark detection hardware logic means 76 is tested against the previously set counter to see whether a 1 or a 0 is embedded in the bit stream.

FIG. 8(E) shows the "check whether control band" subroutine. This subroutine is identified in the main program by numeral CSR00061. The code in this subroutine compares the results of the hardware-microcode PEL counts to determine whether the row of counts represent a control band. If the row is indeed a control band, the bit string representation is moved to the control band array for later processing. If the row is not a control band, it is moved to the bit string to be shipped out at a later time. The program begins with an IF statement identified by numeral CSR00209 and ends with an ELSE statement identified by numeral CSR00212.

The "check control sheet subroutine" is identified in the main program by CSR00063. The check control sheet subroutine is identified in FIG. 8(F). The function of this subroutine is to determine whether or not the control band just encountered is a top or bottom recognition band. If the band is found to be a top recognition band, the sheet is accepted. If the band is a bottom band, the sheet was scanned bottom to top (that is upside down) and is rejected. The first step in the program is an IF statement which is identified by CSR00229. The instruction identified by CSR00230 is a THEN-DO statement. The THEN-DO instruction is processed if a control sheet decision has not yet been made. The instruction is terminated by the END-THEN statement CSR00250. Likewise, the DO-FOR statement CSR00232 terminates at the END-FOR statement CSR00242. The THEN-DO statement CSR00234 is terminated at the END-THEN statement CSR00241. The THEN-DO statement CSR00236 is terminated at END-THEN statement CSR00239. Finally, the ELSE statement CSR00240 is terminated with the END-ELSE statement CSR00248.

FIG. 8(B) shows the subroutine for the "sum tally counts." This subroutine is identified in the main program by numeral CSR00071. This subroutine adds the tally counts of the control sheet recognition hardware device to the total counters. These counters are the count of PELs within a grid placed over a marked area. One counter is designated for each markable location across the paper. These counters are summed during the up-time. These counters are summed for the scan lines when a reference mark is seen. Once the bottom of a mark is seen, which is when a, 'no reference found' received, the counters are converted to bit strings of ones and zeros representing those positions that are marked and unmarked. The program begins with DO-FOR statement CSR00096 and ends with an END-FOR statement CSR00098. Although a particular set of software programs have been described for processing the marks on the control sheet, it should be noted that it is within the skill of the art to generate other programs without departing from the scope and spirit of the present invention.

As stated before, network information relative to document distribution parameters is encoded in the scanner control and transmitted to a network node for further processing. At the network node, a plurality of software programs translate the encoded bit stream into network distribution parameters. The software programs will now be described.

3. The Host Control Sheet Support Algorithm

Figure 7:
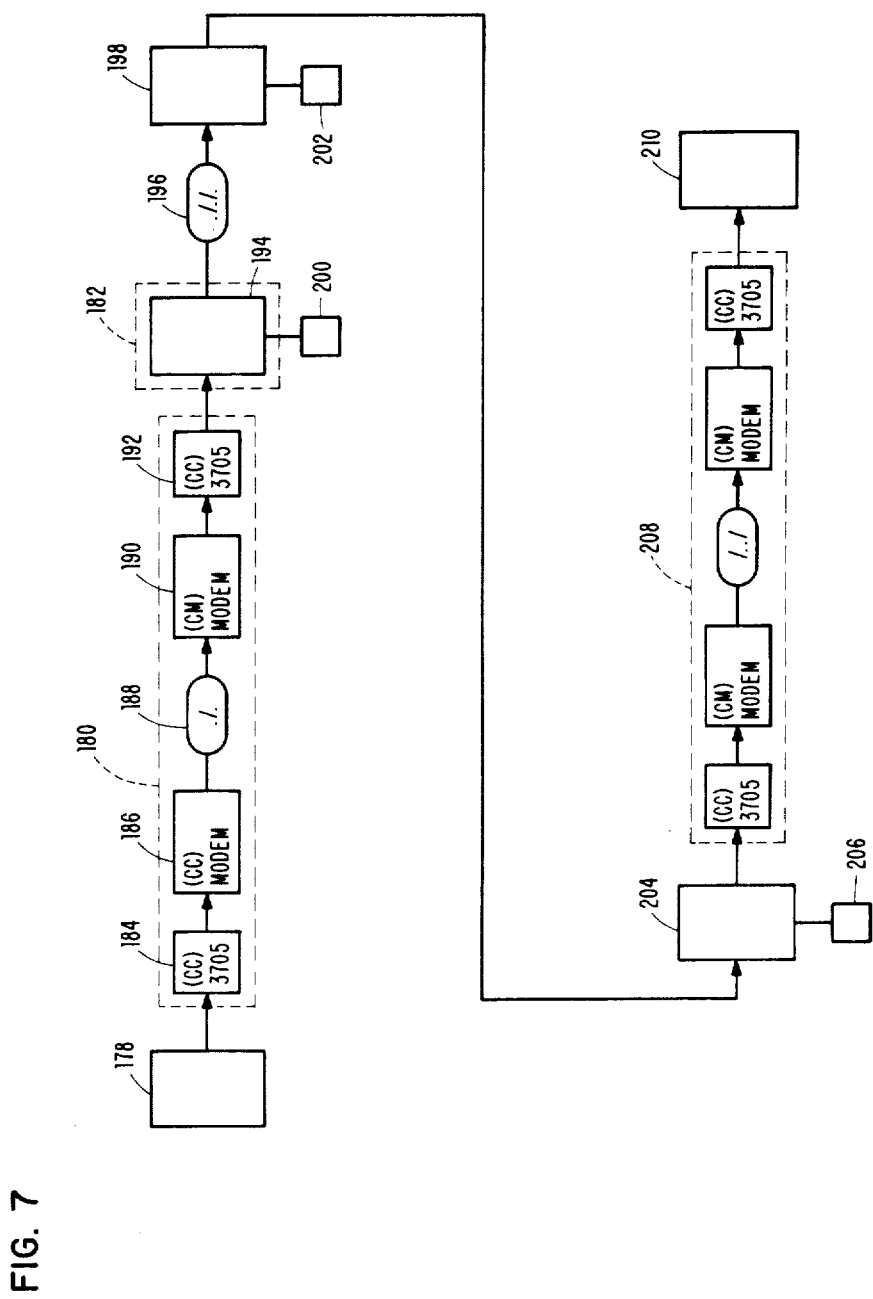
FIG. 7 is an illustration of a typical network configuration with a controller, at the network node, to process the contents of the control cover sheet.
Figure 9:
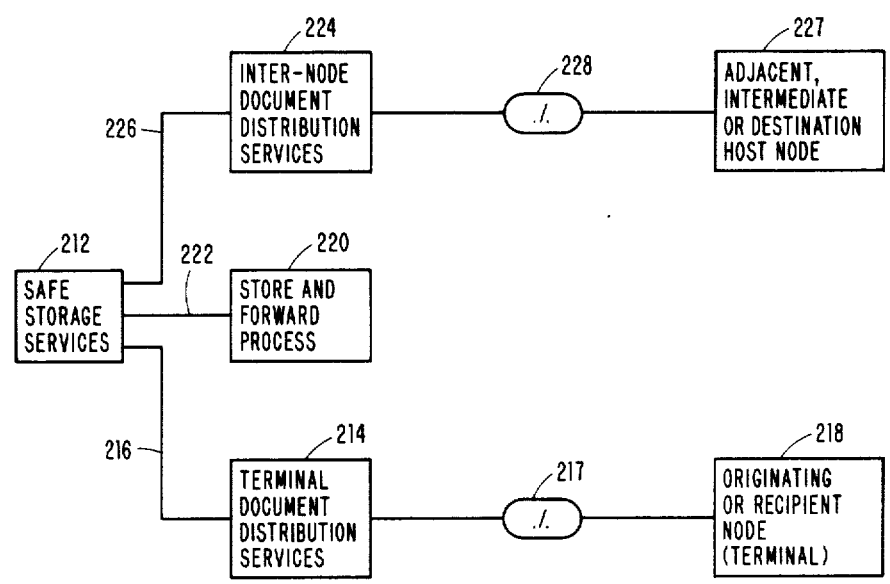
FIG. 9 is a block diagram of the controller of FIG. 7.

A detailed block diagram of a network distribution system is shown in FIG. 7. The system includes a conventional optical scanner 178. The function of the scanner is to scan control sheets and documents which are to be transmitted to one or more receiving nodes. The output from the scanner is transmitted over a communication link 180 to a first host node 182. The communication link 180 may include a communication controller (CC) such as a 3705. The output from the 3705 is fed into a communication control modem 186. The output from communication modem 186 is fed over communication channel 188. The communication channel 188 may be telephone lines, satellite, microwaves, etc.

Communication modem 190 and communication controller 192 are connected in series. Their function is to accept the signal from the communication channel 188 and to deliver it to node 182. The host node 182 usually includes a central processing system such as a conventional computer. The function of the computer at host node 182 is to accept the transmitted data and control information from the control sheet, process the information, and retransmit it over communication channel 196 to intermediate node 198. Both intermediate node 198 and host node 194 are fitted with auxiliary storage devices 200 and 202, respectively. By way of example, these auxiliary storage devices can be direct access drives, etc. From intermediate node 198, the data is transmitted to a destination node 204. Auxiliary storage facility 206 is coupled to node 204. The output from destination node 204 is coupled over communication link 208 to receiving node 210. The communication link 208 incorporates elements substantially equivalent to the element described in communication link 180. Therefore, the details of these components will not be enumerated. In the preferred embodiment of this invention, receiving node 210 is a facsimile printer. Except for the control sheet software programs residing in the nodes of FIG. 7, the elements in FIG. 7 are substantially equivalent to the elements in a conventional IBM S/370 or equivalent system. The IBM S/370 is described in the above-referenced article by Gary D. Schultz. The article may be consulted for detailed description of the system. The teaching in those systems and the article are incorporated herein by reference and details will not be given.

In FIG. 7, the programming modules or components which reside in node 194, 198 or 204 are shown. The node includes a safe storage services 212. The function of the safe storage services is to store data. To this end, the safe storage services is a conventional buffer having conventional controllers for directing the flow of data into and out of the buffer. The terminal document distribution services 214 is coupled over conductor 216 to the safe storage services. The output from terminal document distribution services 214 is coupled over communication channel 216 to an originating or receiving node terminal 218. In the preferred embodiment of this invention, the originating node is a conventional optical scanner, while receiving node is a facsimile printer. The terminal document distribution services includes a plurality of software programs adapted to process requests coming from an originating receiving node such as a scanner involving a cover sheet. The terminal document distribution services perform the following functions:

Uses the safe storage facility to store transmitted documents and bit map on permanent storage.

Interprets the bit map sufficiently to determine that it is indeed a document distribution request.

Transforms the distribution control marks into equivalent distribution control parameters using a translation map for distribution requests.

Uses a form number indicated by a portion of the bit map that represents a specific address mark translation map.

Retrieves the translation map and uses it to convert address band marks to network address of the document distribution node involving intended recipient.

Replaces the bit-encoded document distribution requests header with the actual document distribution request header.

Queues the document distribution request for processing by the store-and-forward process. From here on, the request header can be handled as if it had come from a coded information terminal such as a keyboard.

As indicated by controls, or as explicity requested via separate cover sheets or coded information (CI) terminal requests, the terminal document distribution services also establishes a communicating session with each addressed receiving terminal, transmits the terminal print controls originally indicated via marks by the sender and transmits the document contents to the receiving node for printing.

The store and forward process component 220 is coupled to the safe storage services 212 through conductor 222. The function of the store and forward process component 220 is to process document routing and transmission algorithms which are governed by distribution controls originally indicated via marks on the scanned cover control sheet. The store and forward process component performs the following functions:

Retrieves the document distribution request header and list of network recipient user identification and document distribution nodes.

Uses the distribution controls to indicate mode of transmission (example: immediate, delayed, etc.) distribution acknowledgement requests, etc.

Uses the recipient network location address to sort by unique destination node identification and attaches the specific list of recipient identification for each destination identification.

Queues up a request for each adjacent intermediate or destination node.

The internode document distribution services 224 is coupled through conductor 226 to the safe storage services. The intermediate node document distribution services is coupled through communication link 228 to an adjacent intermediate or destination host node. It is worthwhile noting that if an intermediate node is not present in the system, the data moves from the originating node to the document distribution node and then to the receiving node. In the event that the system includes intermediate nodes, the document and controlled information are forwarded through the intermediate node to the destination node. To this end, the internode document distribution services 224 performs different functions. The function depends upon whether or not it is positioned at an intermediate node such as node 198 (FIG. 7) or in a destination node such as 204 (FIG. 7). At the intermediate node, the internode document distribution services performs the following functions:

Retrieves a document from safe storage via the safe storage facility.

Transmits a single copy of the document data contents and the destination node's distribution request list to each adjacent intermediate or destination node using transmission scheduling factors governed by distribution controls.

When its own node is acting as the destination node, queues requests for processing by the terminal document distribution services component.

At each destination's nodes, the internode document distribution services performs the following functions:

The internode document distribution services component receives the document request and uses the safe storage services facility to store its contents.

The store-and-forward process interprets the request to determine that there is one or more recipients associated with one or more recipient nodes (terminal) attached to this node.

The generation of digital computer programs to perform the above-enunciated functions or steps are well within the skill of an artisan skilled in the art of computer programming. This being the case, the details of such a program will not be given. Suffice it to say that the program which implements the above factions encodes the bit streams carrying document distribution information into a form which can be recognized by a conventional store and forward document distribution routine or a conventional document interchange architecture routine. These routines distribute the document in accordance with the transmitted instructions. By way of example, an article in the IBM System Journal entitled "Electronic Information Interchange in an Office Environment" by M. R. DeSousa (pgs. 4–22) describes an architecture which can be used to distribute the instructions. The article is incorporated herein by reference.

OPERATION

In operation, documents to be transmitted over the facsimile network are first preceded by a document control sheet. The document control sheet contains information which controls the input scanner, the network node/nodes and the facsimile printer which reproduces the transmitted documents. In the event that other types of control sheets are needed, those sheets follow the document distribution sheet. In essence, the order in which documents are processed, is as follows: the document control sheet which is the first sheet for each job is scanned by the scanner. If a continuation or other type of sheet is needed, that sheet is next scanned. The actual documents are next scanned by the scanner. The continuation sheet is an example of other types of control sheets. The control information on the control sheet is prepared by an operator in accordance with desired scanning, distribution and printing requirements.

The operator then places the job control sheet on the document glass of the scanner. The scanner and the scanner control mechanism formulates bits of digital information which represent the controlled instructions on the job control sheet. The bits representing instructions are buffered in a conventional buffer which is associated with the scanner. The digital data in the buffer is next accessed by the mark detection hardware logic means and the cover sheet microcode algorithm means. These means identify the instructions which are designated to control the scanner, the network nodes and the facsimile output printer.

The bit streams representing information for controlling the scanner and the printer are formulated into parameters for controlling these devices. The parameters for controlling the printers are extracted and are routed to the conventional scanner control means. These conventional scanner control means are part of the scanner mechanism and, as such, details are not given. The scanner control parameters are used by the scanner control to control the scanner in accordance with the instructions. Similarly, the parameters for controlling the printers are transmitted over the network where it is routed to the respective printers. At the printers, the conventional printer controls utilize the transmitted parameters for reproducing the document. Because the printer control information is processed (that is transformed into printer control parameters) at the scanning unit, there is no need to incorporate processing circuitry in the printer. It should be noted that such circuitry may be incorporated without departing from the scope of the present invention.

The information for controlling document distribution is encoded into bit stream tags with identification numbers and transmitted over the transmission network. At the network node, the host control sheet support algorithm accesses the bit streams and converts the bit streams into network parameters. These network parameters are used by the host's computer in the network for distributing and/or routing the data.

While the invention has been particularly shown and described with reference to a preferred embodiment thereof, it will be understood by those skilled in the art that various changes in form and details may be made therein without departing from the spirit and scope of the invention.

What is claimed is:

1. The combination comprising:
   documents containing information to be communicated over a network means, said network means including
   a plurality of station means, each station means including
   scanning means for converting the information contained in said documents into electrical signals,
   transmission means coupled to said scanning means for transmitting said electrical signals,
   receiving means for receiving transmitted electrical signals, and
   printing means coupled to said receiving means for converting received electrical signals into documents; and
   a plurality of interconnected host means, each coupled to at least one of said station means for selectively routing transmitted electrical signals from the transmission means of a coupled station means to a designated host means, for selectively routing transmitted electrical signals from one host means to another host means, and for selectively routing transmitted electrical signals from a host means to the receiving means of a designated coupled station means;
   job control document means for conveying information via said scanning means and transmission means of a station means to control the selective routing of electrical signals by said host means, said job control document means including
   means for conveying input control information,
   means for conveying output control information, and
   means for conveying routing distribution information;
   means in each of said plurality of host means for recognizing and interpreting input control information to cause said host means to accumulate electrical signals representative of a number of documents containing information to be communicated, said number of documents specified by said input control information; and
   means in each of said plurality of host means for recognizing and interpreting routing distribution information to cause said host means to route said accumulated electrical signals to another host as specified by said routing distribution information including output control information and routing distribution information for intermediate host means in the path to said designated coupled station means.

2. The combination comprising:
   a plurality of facsimile machines for transmitting and receiving signals representative of documents;
   a plurality of node means for providing communications of signals from one of said plurality of facsimile machines to a different one of said plurality of facsimile machines, each of said node means including
   means for coupling each said plurality of node means to at least one of said plurality of facsimile machines,
   means for coupling each said plurality of node means to at least one other one of said plurality of node means,
   switching means for routing signals from a coupled one of said plurality of facsimile machines to a coupled other one of said plurality of node means, from a coupled other one of said plurality of node means to a different coupled other one of said plurality of node means, and from a coupled other one of said plurality of node means to a coupled one of said plurality of facsimile machines according to routing command signals; and control document means capable of being read by said facsimile machines for providing control information including said routing command signals.

3. The combination claimed in claim 2 wherein each of said node means further includes control means for controlling a coupled one of said plurality of facsimile machines according to machine control signals and the control information provided by said control document means also includes machine control signals.

4. A method for controlling the interconnection of a plurality of facsimile machines in a communications network wherein each facsimile machine is selectively connectable to every other facsimile machine of said plurality through a series of n switching nodes in response to routing command signals, where n is an integer greater than one, comprising the steps of:

reading a control document by an originating facsimile machine where by control information from said control document is converted to routing command signals;

communicating routing command signals to a first switching node;

connecting said originating facsimile machine to at least a second switching node through said first switching node according to the communicated routing command signals;

transferring from said first switching node to said second switching node those routing command signals for controlling said second switching nodes and any subsequent switching node in said series;

repeating as necessary said connecting and transferring steps to connect an i-th switching node to an (i+1)-th switching node according to the transferred routing command signals and to transfer those routing command signals for controlling the (i+1)-th switching node and any subsequent switching node in said series, where i is an integer having successive values from 2 to n-1, inclusive; and connecting the nth switching node to a destination facsimile machine according to the transferred routing command signals.

5. The method claimed in claim 4 including the further step of transmitting from said originating facsimile machine to said destination facsimile machine a number of documents controlled by said first switching node according to said control information from said control document.

* * * * *